May 2, 1939. W. H. DAVIS 2,156,841
TIRE PRESSURE CONTROLLING APPARATUS
Filed April 9, 1938 3 Sheets—Sheet 1
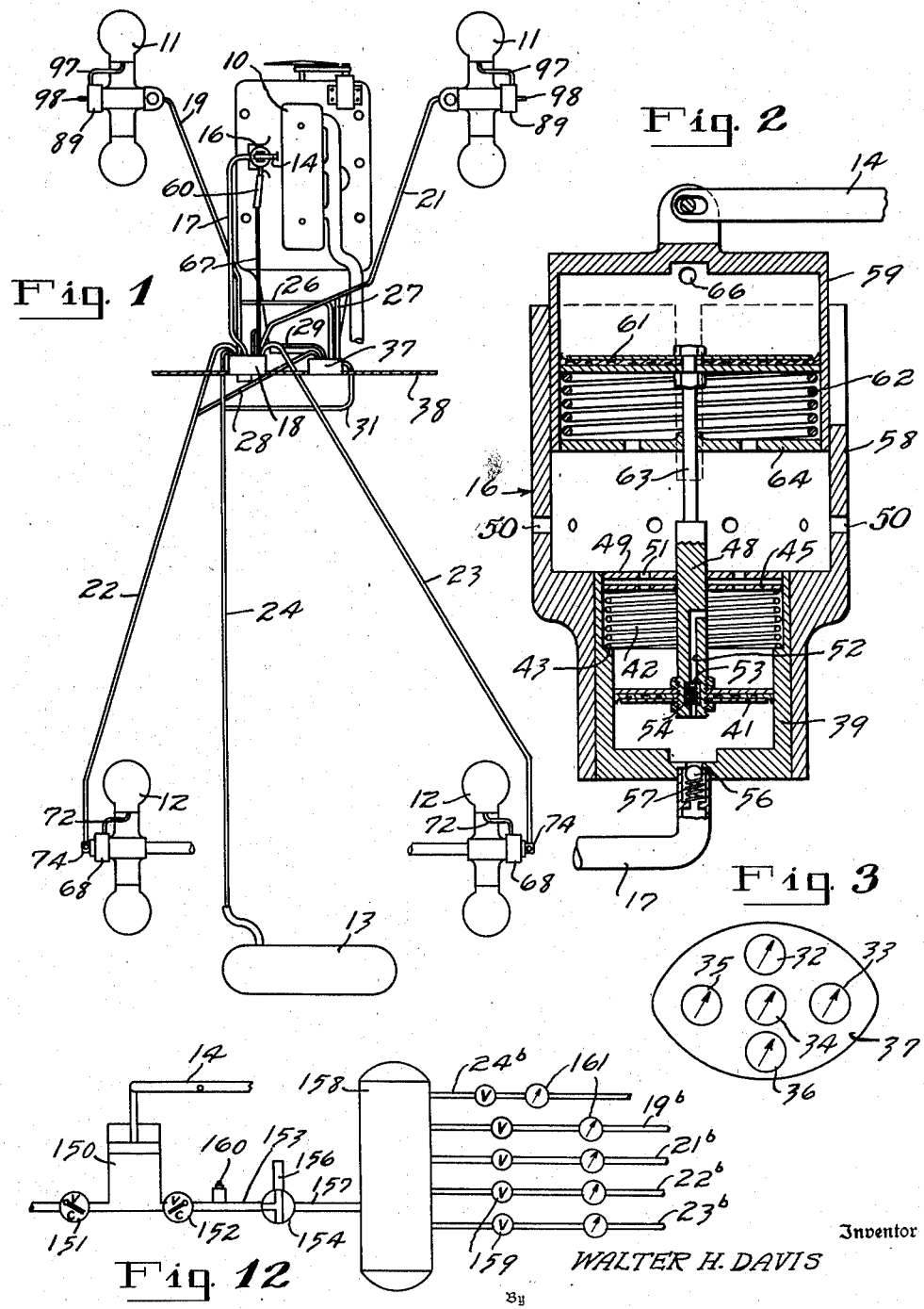
Inventor
WALTER H. DAVIS
By Johnston & Jennings
Attorneys Inventor
WALTER H. DAVIS
By Johnston & Jennings
Attorneys May 2, 1939.  W. H. DAVIS  2,156,841

TIRE PRESSURE CONTROLLING APPARATUS

Filed April 9, 1938  3 Sheets—Sheet 3

Inventor
WALTER H. DAVIS
By Johnston & Jennings
Attorneys

Patented May 2, 1939

2,156,841

UNITED STATES PATENT OFFICE 2,156,841

TIRE PRESSURE CONTROLLING APPARATUS

Walter H. Davis, Alexander City, Ala.

Application April 9, 1938, Serial No. 201,153

11 Claims. (Cl. 152—416)

This invention relates to means on a motor vehicle for inflating the pneumatic tires thereof and for indicating the pressure therein at a central point, as on the dash, or instrument board of the vehicle, and has for an object the provision of apparatus of the character designated which shall be reliable in operation and which may be readily installed on existing vehicles.

A still further object of my invention is to provide a tire inflating and pressure indicating apparatus which shall include an improved pressure tight connection between rotating and non-rotating parts which shall be simple and durable, proof against leakage, and which shall include means whereby a supply of lubricant for the relatively rotating parts is always available.

A still further object of my invention is to provide an air compressor for inflating the tires together with a simplified drive for the compressor from the vehicle engine.

A further object of my invention is to provide apparatus of the character designated which shall include means to inflate the tires, means to indicate the pressure in the tires at some central point, such as on the vehicle dash, and means to equalize the pressure in the various sets of tires.

Many efforts have heretofore been made to provide a means whereby the operator of a motor vehicle could know at all times the pressure within the tires; and also to provide a means on the vehicle for inflating the tires, and for equalizing the pressure within the tires. So far as I am aware, none of these proposals has found its way into commercial use. The principal difficulty in the design of apparatus of the character herein described has been to provide a tight joint between rotating and non-rotating parts and also a joint which would reduce friction to a point where there is not excessive wear between such relatively movable parts.

This difficulty has been overcome, in accordance with my invention, by the provision of a pressure chamber in each hub cap having a flexible, or diaphragm wall, and by connecting this pressure chamber to its associated tire. A hollow axially extending stem connected to the diaphragm extends into an axial passage in a non-rotating part facing the diaphragm. The stem is packed against leakage and in addition, co-operating seats in the passage and on the stem provide a pressure tight rotating joint. The mechanism being in the hub cap, a supply of lubricant is available or may be made available for the relatively rotating parts. Other features of my invention reside in a compressor driven from the motor, an improved connection between the motor and the compressor, and improved valve means for connecting the compressor to the various vehicle tires and for equalizing the pressure in the various sets of tires.

These and other features are illustrated in the accompanying drawings forming a part of this application, in which:

Fig. 1 is a diagrammatic view showing a general layout and typical piping arrangement employed with my invention;

Fig. 2 is a detail sectional view of an air compressor and its drive;

Fig. 3 is a view of a typical arrangement of gauges on the instrument panel of the vehicle;

Fig. 12 is a diagrammatic view showing a modified means for inflating and equalizing pressure within the tires.

Figure 4:
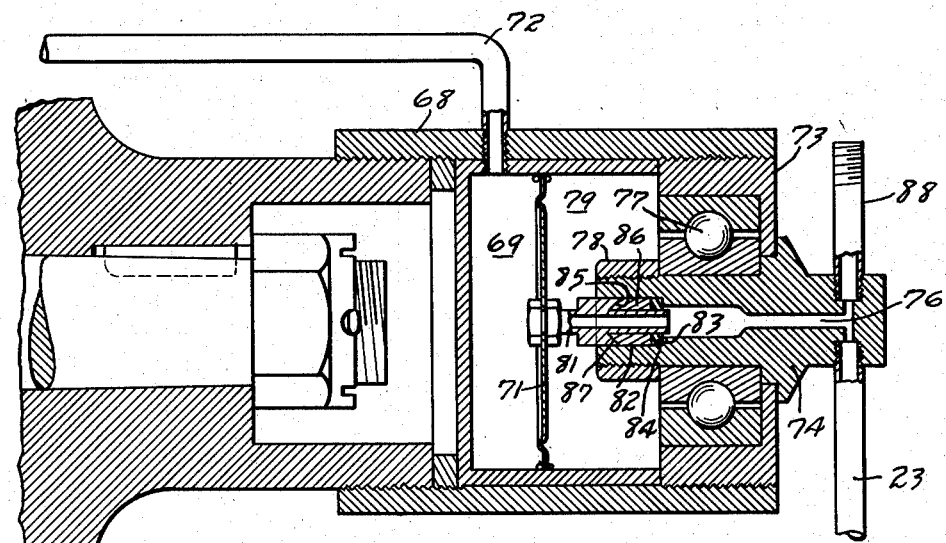
Fig. 4 is a sectional view showing the means connecting the pressure lines to the rear tire of the motor vehicle.

Referring to the drawings, I show a motor vehicle comprising an engine 10, front pneumatic tired wheels 11, and rear pneumatic tired wheels 12. A spare tire 13 may be carried, and mounted in any suitable place on the vehicle. Connected to a moving part of the engine 10, in any suitable manner, not shown, is a reciprocating arm 14 for driving an air compressor 16. The air compressor delivers air under pressure through a conduit 17 to a distributing valve 18, from which it may be directed, in a manner to be more particularly described hereinafter, through pipes 19 and 21 to the front pneumatic tires 11; through pipes 22 and 23 to the rear pneumatic tires 12; and through a pipe 24 to the spare tire 13. The said pipes 19, 21, 22, 23 and 24 are connected through pipes 26, 27, 28, 29 and 31, to a plurality of gauges 32, 33, 34, 35, and 36, enclosed within a frame 37 mounted on the instrument panel 38 of the vehicle, where the pressure in each pneumatic tire may be observed at all times. It will be understood that dual type gauges may be used, if desired.

The air compressor 16 comprises a cylinder 39 enclosing a single acting piston 41 which compresses on its down stroke and which is moved upwardly from its downward position by means of a spring 42 resting against an abutment 43 in the cylinder wall and bearing against a plate 45 secured in any suitable manner to the piston rod 48, which latter extends outwardly through the upper end 49 of the cylinder. The upper end 49 of the cylinder is open to the atmosphere through ports 50 and 51. The piston rod 48 is provided with a longitudinal passage 52 opening into the upper end of the cylinder, at the lower end of which is a valve 53 normally held on its seat by a small spring 54. As the piston 41 moves upwardly, air enters through the passage 52 and passes beneath the piston past the valve 53. On its down stroke, the valve 53 is held on its seat by the spring 54 and the pressure of air ahead of the piston 41. Compressed air is forced outwardly of the cylinder 39 past a check valve 56 normally held on its seat by means of a spring 57, and which is connected to the discharge pipe 17 leading to the distributing valve 18.

Mounted above the cylinder 39 in suitable guideways 58, is a cylindrical member 59 connected directly to the reciprocating arm 14 so that it reciprocates at all times when the engine is running. Disposed within the cylindrical member 59 is a piston 61, and beneath the piston 61 is a spring 62 adapted normally to hold the piston in its uppermost position. A piston rod 63 extends downwardly through the bottom wall 64 of the cylindrical member 59, and is opposite the upper end of the piston rod 48. Normally, the spring 62 holds the piston 61 in its uppermost position, so that the piston rod 63 does not contact the upper end of the piston rod 48, and the compressor is not operated, the member 59 merely reciprocating back and forth in its guide 58. If air under pressure be admitted to the upper end of the cylinder 59, it forces the piston 61 downwardly and the piston rod 63 engages the piston rod 48. Then, as the cylinder member 59 moves downward, the piston 41 is forced downward, compressing air ahead of it, while the spring 42 causes the piston rod 48 to move upwardly as the piston 61 moves upwardly. The area of the piston 61 is made much greater than the area of the piston 41, whereby a much lower pressure than the delivered pressure of the compressor 16, when admitted on top of the piston 61, will cause the compressor to operate. In the upper end of the cylinder 59 is a port 66 to which is connected a pipe 67 leading to the equalizing and distributing valve 18. Whenever it is desired to operate the pump, the distributing valve 18 is turned to a position to be described in detail hereafter, to admit air under pressure through the pipe 67 and port 66 to the cylinder 59. In order to allow for movement of the cylinder 59 I interpose a piece of flexible hose 60 between the cylinder and its pipe 67.

Figure 5:
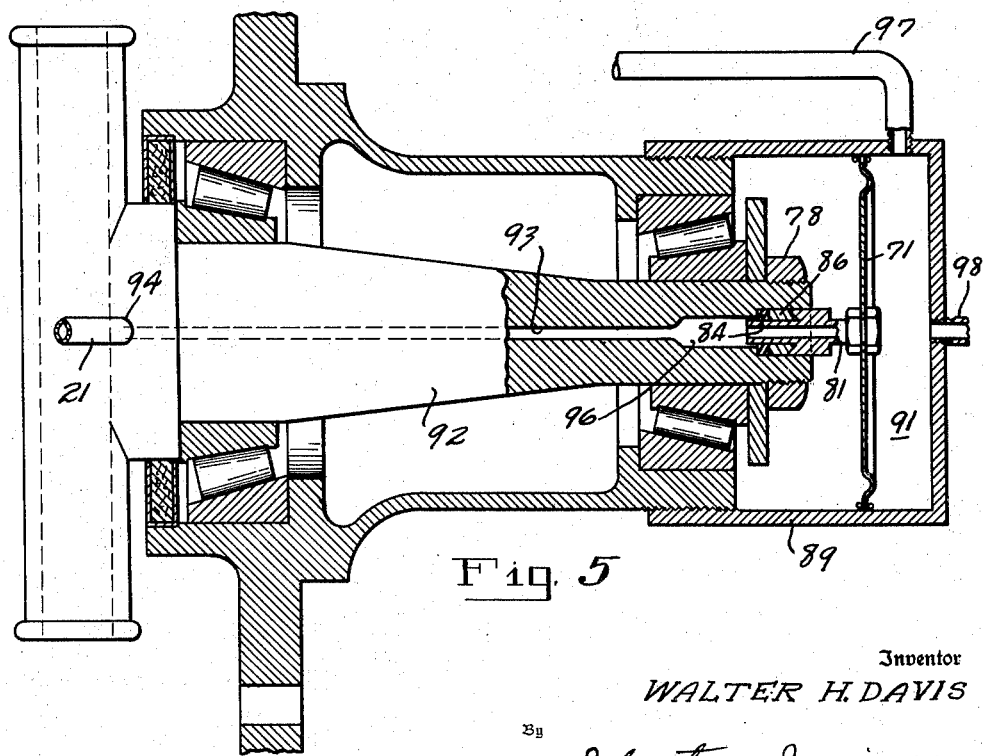
Fig. 5 is a view showing a method connecting the pressure lines to the front tire of a motor vehicle.

Referring now to Figs. 4 and 5 of the drawings, I show the means by which the pipes 19, 21, 22 and 23 are connected to the tires on the wheels of the vehicle. Fig. 4 illustrates the means preferably employed for the rear wheels of the vehicles, and Fig. 5 the means employed for the front wheels of the vehicle, though the means shown in Fig. 4 might be employed for both front and rear wheels, if desired.

Referring first to Fig. 4, in accordance with my invention I provide a special hub cap 68 which encloses a pressure chamber 69 formed by a cylindrical cup-like member having a resilient diaphragm wall 71. The pressure chamber 69 is connected to its associated tire through a pipe 72, so that the pressure within the tire is always within the pressure chamber 69. Mounted within the outer end 73 of the hub cap 68 is a relatively non-rotating member 74 having an axially extending passage 76 therein. A ball bearing 77 is provided between the member 74 and the hub cap 73, whereby the hub cap can rotate freely relative to the non-rotating member 74. The member 74 is held firmly in place with respect to the ball bearing race by means of a nut 78 secured onto the inner end thereof. It will be noted that the construction described affords a chamber 79 which may be packed with lubricant to insure free relative movement between the member 74 and the hub cap.

Carried by each resilient diaphragm 71 is a hollow stem 81 which extends into the axial passage 76 of the member 74. The passage 76 is widened at 82 to provide a shoulder 83 surrounding the outer end of the stem 81. A suitable packing 84, made of such material as rubber or an oil-insoluble packing material, such as synthetic rubber, surrounds the stem 81 and rests against the shoulder 83. Resting against the packing 83 and surrounding the stem 81 is a seat member 86 provided with an inverted conical seat 87 thereon. The stem 81 at this point fits snugly within the inner end of the widened passage 82, and is provided with a seat 85 coacting with the seat 87 to insure an air tight fit which prevents leakage from the tire through the stem and its cooperating non-rotating member 74. The tire associated with the hub cap 68 may be inflated from an outside source through the usual tire inflating valve 88, which is here shown mounted on the non-rotating member and connects with the passage 76. The pipe 23, as shown in Fig. 4, connects to the outer end of the member 74 and with the passage 76. It will be readily seen that pressure within the pressure chamber 69 acting against the diaphragm 71 forces the seats 85 and 87 to remain in fluid tight contact. With hub caps of large diameters, it may be necessary to reduce the size of the diaphragm 71 in order that the pressure on the seats shall not be too great.

In Fig. 5 I show an adaptation of the foregoing described device for connection to the front wheel of the vehicle. In accordance with this modification, a hub cap 89 is employed which encloses within its outer end a pressure chamber 91. The pressure chamber 91 is provided with a flexible diaphragm wall 71, as in the previously described modification, which wall 71 carries an axially extending hollow stem 81, which stem, however, in accordance with this invention, extends inwardly of the hub cap, rather than outwardly. A front axle is shown at 92 and is bored centrally to form an axial passage 93 extending therethrough, and to which the pipe 21 is connected at its inner end at 94. The passage 93 is widened at 96 to provide for the installation of the packing 84 and seat member 86, as in the previously described modification. The associated tire is connected with the pressure chamber 91 through a pipe 97, and the tire may be inflated from an outside source through a valve 98 of the form usually associated with pneumatic tires.

With either form it will be seen that the seat portion of the stem 81 is held on the seat 87 at all times by the resiliency of the diaphragm 71 and by the pressure in the pressure chamber. It will also be seen that the construction is such that before any air can reach the seat portions and beyond, it must pass through the tortuous passages defined by the enlarged portion of the stem, past the seats, again around the stem and past the gasket 84. I have found that this arrangement effectively prevents leakage. In the arrangement shown in Fig. 4 the stem 81 is immersed in the grease packing for the front wheel bearings so that there is always present lubrication for the stem 81.

Where dual wheels are employed, as is the practice with large trucking vehicles, at the rear, the pipe 72 may be connected to an equalizing member 99 having branch pipes 101 and 102 leading therefrom to the dual tires 103 and 104. The member 99 may enclose a piston 106 having a piston rod 107 secured thereon and held normally in mid position by means of springs 108 and 109 bearing against the piston and suitable abutments 111 and 112. The piston rod 107 is somewhat shorter than the length of the equalizing member 99 and carries on its opposed ends valve members 113 and 114, which are adapted to seat against seats 116 and 117 connected respectively to the pipes 101 and 102. A restricted passage 105 extends through the piston 106. With the arrangement shown, the tires 103 and 104 may be inflated in unison to equal pressures. Should, however, one of the tires, in operation, blow out, or become suddenly deflated from any cause, the greater pressure in the associated tire will cause the piston 106 to move in the direction of the injured tire, and the valve 113 and 114, as the case may be, will then seat and prevent rapid loss of pressure from the uninjured tire, the piston 106 assuming a position under such circumstances as to be past the pipe connection 72. The restricted passage 105, however, will allow a slow leak of pressure from the uninjured tire into the opposite end of the equalizer 99, and when the pressure within the opposite end has built up to near that of the other end, the valve 113 or 114, as the case may be, will unseat momentarily, permitting a slight drop in pressure in the uninjured tire. This will give the operator of the vehicle sufficient time to note the injury to the tire and to stop before both tires become flat.

Figure 8:
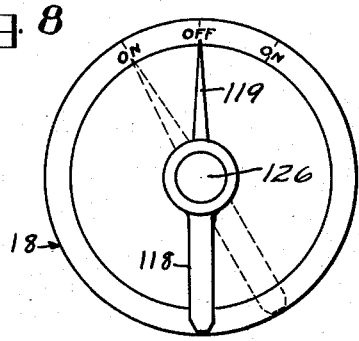
Fig. 8 is an outside view of a distributing and equalizing valve employed with my invention.
Figure 9:
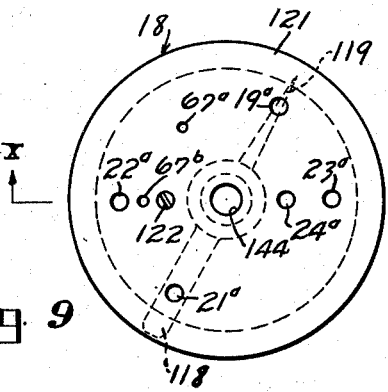
Fig. 9 is a bottom plan view of the valve seat turned to the position as shown by the dotted lines of Fig. 8.
Figure 6:
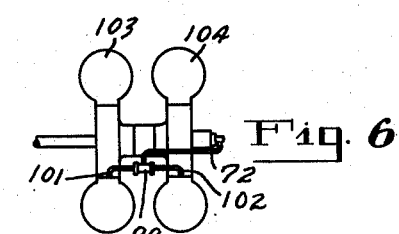
Figs. 6 and 7 are views illustrating one means of equalizing the pressure in dual tires.
Figure 7:
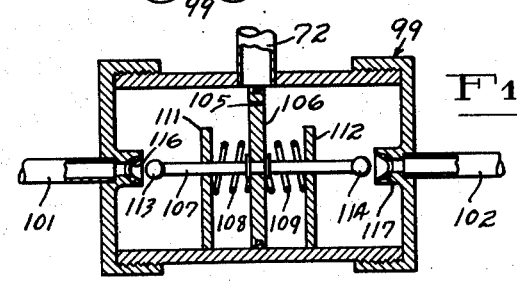
Figure 10:
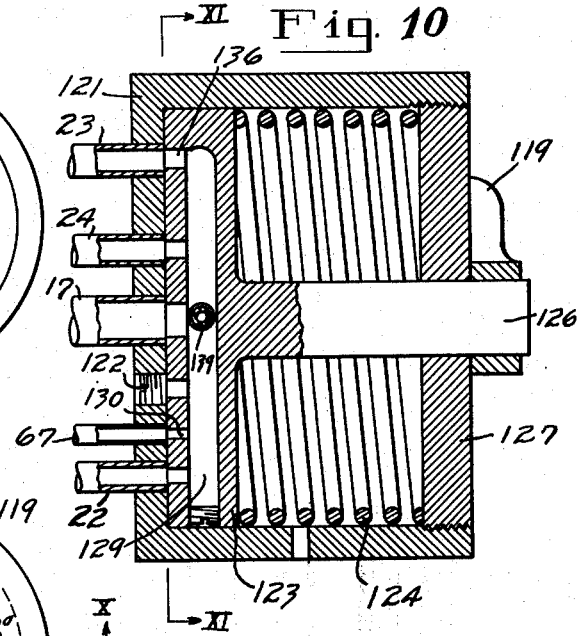
Fig. 10 is an enlarged sectional view taken along the line X—X of Fig. 9.

Referring now to Figs. 8 to 11 inclusive, I will describe the detail construction of the distributing valve 18. The valve 18, as shown, is mounted on the instrument panel 38 and is provided with an operating handle 118 with a pointer 119, which may be set to suitably designated operating positions. The valve 18 comprises a seat 121 which preferably has cylindrical walls forming a cup-like construction, and to which is connected the pipes 19, 21, 22, 23, 24 and 67 previously described. These pipes terminate, as shown in the seat in Figs. 9 and 10, in ports 19a, 21a, 22a, 23a, and 24a. The pipe 67, which leads to the port 66 in the top of the cylindrical member 59, divides and has two connections terminating in two ports 67a and 67b, as shown in Fig. 9. Additional connections to the seat may be made, as shown at 122, in case there are a plurality of spare tires or a trailer. In this instance, the connection 122 is shown plugged, as with a screw.

Figure 11:
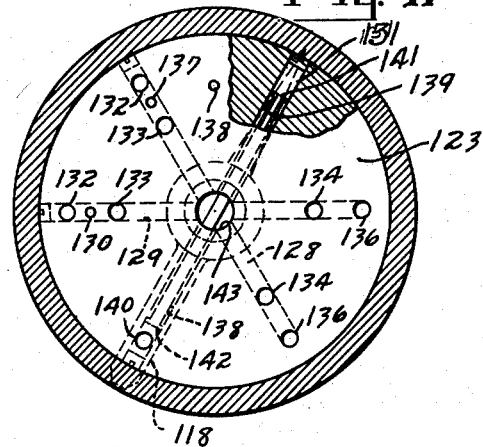
Fig. 11 is a bottom plan view, somewhat reduced in size from Fig. 10, and partially in section, of the rotary valve member.

Cooperating with the valve seat 121 is a rotary valve 123 which fits within the cylindrical walls of the seat member 121 and which is held on its seat by means of a relatively heavy spring 124. An operating stem 126 extends outwardly through the cover 127 of the valve assembly, and has connected to it the operating handle 118. The valve 123 is provided with three crossed passages 128, 129, and 131, as shown in Fig. 11. The passages 128 and 129 are provided with similarly arranged ports 132, 133, 134 and 136, which are adapted to register with corresponding ports in the valve seat 19a, 21a, 22a, 23a, and 24a. The passage 128 is also provided with a port 137 which is adapted, when the rotary valve is turned to the proper position, to connect with either of the ports 67a or 67b in the valve seat as the valve is turned. The valve 123 is provided with a port 138, which extends entirely through it, and which is adapted, when the valve is turned to the "off" position, to connect with port 67a and permit air from above the piston 61 to escape through the ports 66 and 67a to the atmosphere. The passage 131 in the rotary valve 123 is an equalizing passage, as will be hereinafter more particularly explained, and has positioned in it a small pipe 139 having a flanged fluid tight fit 141 and 142 at each end thereof with the passage, whereby air pressure can only pass from end to end of the passage, and its only connection with the valve seat is through ports 135 and 140 at opposite ends thereof (port 135 being broken away in Fig. 11), and which may be turned to register with ports 19a, 21a, 22a and 23a in the seat. Centrally of the valve 123 is a large port 143, which is in register at all times with a large central port 144 in the valve seat, and to which the pipe 17 from the compressor 16 is connected.

By reference to Fig. 8, it will be noticed that there is a dial surrounding the distributing valve 18, and that the dial is marked with positions "off" and "on" to indicate the position of the rotary valve 123. When the pointer 119 is in the position shown in full lines in Fig. 8, pointing to "off", the only ports in register between the valve and the valve seat is port 138 of the valve which comes over port 67a in the seat. This permits air in the cylindrical member 59 to escape to the atmosphere through port 66, pipe 67, port 67a, and port 138. Whenever the pointer 119 is turned to the position "on" to the right of the position "off", the passages 128 and 129 are rotated until they are directly over ports 19a, 21a, 22a, and 23a. Ports 132 and 136 in the valve register with the ports 19a, 21a, 22a, and 23a. One of the ports 134 registers with port 24a. Port 137 registers with port 67b, which permits air from the tires to flow through the passages 128 and 129 through the port 67b and pipe 67 to the cylinder 59, forcing the piston 69 downward for its stem 63 to engage the stem 48 of the compressor piston 41, thereby putting the compressor in operation. In this position all of the tires on the vehicle are being inflated at once.

When the pointer 119 is turned to the left hand "on" position, the port 130 is in register with port 67b, causing the compressor to be operated, as before described. In this position, the ports 19a and 21a, connected to the pipes 19 and 21 leading to the front tires are connected through ports 140 and 135 (port 135 being broken away in Fig. 11) to equalize the pressure in the front tires, while the pump is inflating the rear and spare tires through pipe 17, port 144, passage 129, and ports 22a, 23a, and 24a.

It will thus be apparent that with the valve construction shown, by turning it to right hand "on" position, the compressor may be put in operation and all the tires, including the spare tires, may be inflated at one time; or if desired, the rear tire and spares may be connected to the compressor and inflated at one time without inflating the front tires by turning the pointer to the left "on" position; or pressure in all the tires may be equalized, but respective pressures in the front and rear sets of tires may be a different value; and finally, the operation of the compressor may be stopped by turning the pointer 119 to the "off" position.

Referring now to Fig. 12, I show a modified form of means for supplying pressure to the various tires. In accordance with this modification, I may employ a compressor 150 which is constantly operated by means of a connection to the reciprocating arm 14, air being drawn in through a check valve 151 and discharged through a similar check valve 152 and through a conduit 153. A three way valve 154 may be turned so that the pump 150 discharges continuously to the atmosphere through a discharge conduit 156, or the three way valve 154 may be turned for the compressor to discharge through a conduit 157 into a manifold or reservoir 158. Connected to the manifold 158 are a plurality of pipes 19b, 21b, 22b, 23b and 24b, leading respectively to the front and rear tires and spare tire of the vehicle. Other connections may be made as demanded. Each of the pipes is controlled by a valve 159 and is provided with a gauge 161, which may be mounted as described for the gauges 32 to 36 inclusive. To prevent excess pressure in the manifold or in the tires, a safety valve 160 is provided in the discharge conduit 153.

With the modification just described, each of the tires may be inflated individually by opening the valve 159 in its associated pipe. Also, the pressure in all the tires may be equalized by opening all the valves 159 and allowing the tires to inflate to the pressure of the manifold as determined by the setting of the safety valve 160.

From the foregoing description, the operation of my improved apparatus will be clearly understood. It will be seen that I have provided a means whereby the tires on a motor vehicle in operation may be readily inflated from the compressor actuated by the motor, and that there is provided a practical, simple, and reliable pressure connection between the relatively rotating parts which is not liable to leakage and which, being at all times in the presence of a lubricant, is well lubricated and not liable to excessive wear. It will furthermore be apparent that I have devised an improved means for inflating and equalizing the pressure within the several tires of the vehicle and for controlling the operation of the compressor.

While I have illustrated and described herein the preferred means for constructing and operating my invention, it will be obvious to those skilled in the art that it is not so limited, but that it is susceptible of various changes and modifications, without departing from the spirit thereof, and I desire, therefore, that only such limitations shall be placed thereupon as are imposed by the prior art or as are specifically set forth in the appended claims.

What I claim is:

1. In apparatus for controlling and indicating pressure in the tires of motor vehicles, a hub cap on each wheel of the motor vehicle and enclosing a pressure chamber, a flexible diaphragm comprising one transverse wall of the pressure chamber, a hollow axially extending stem carried centrally by the diaphragm and communicating with the chamber, means defining an axially extending non-rotating passage into which the stem fits, cooperating seat members on the stem and in the passage, a compressor on the vehicle, means to connect the compressor to the passage, and means to connect the pressure chamber to its associated tire.

2. In apparatus for controlling and indicating pressure in the tires of motor vehicles, a hub cap on each wheel of the motor vehicle and enclosing a pressure chamber, a flexible diaphragm comprising one transverse wall of the pressure chamber, a hollow axially extending stem carried centrally by the diaphragm, means defining an axially extending non-rotating passage into which the stem fits, cooperating seat members on the stem and in the passage, means to lubricate the seat, a compressor on the vehicle, means to connect the compressor to the passage, and means to connect the pressure chamber to its associated tire.

3. In apparatus for controlling and indicating pressure in the tires of motor vehicles, a hub cap on each wheel of the motor vehicle and enclosing a pressure chamber, a flexible diaphragm comprising one transverse wall of the pressure chamber, a hollow axially extending stem carried centrally by the diaphragm and communicating with the chamber, means defining an axially extending non-rotating passage into which the stem fits, cooperating seat members on the stem and in the passage, means to connect each pressure chamber to its associated tire, valve means for connecting simultaneously all the said axially extending passages of the motor vehicle, a compressor on the vehicle and means to connect the compressor through the valve means to said axially extending passages.

4. In apparatus for controlling and indicating pressure in the tires of motor vehicles, a hub cap on each wheel of the motor vehicle and enclosing a pressure chamber, a flexible diaphragm comprising one transverse wall of the pressure chamber, a hollow axially extending stem carried centrally by the diaphragm and communicating with the chamber, means defining an axially extending non-rotating passage into which the stem fits, said passage being enlarged toward the outer end to provide a shoulder surrounding the hollow stem, a yieldable packing gasket resting on the shoulder and surrounding the stem, a conical seat member resting on the gasket and surrounding the stem, a cooperating seat member on the stem, a connection from each pressure chamber to its associated tire, pressure indicating means mounted on the vehicle, and a connection from each non-rotating passage to the pressure indicating means.

5. In apparatus for controlling and indicating pressure in the tires of motor vehicles, a hub cap on each wheel of the motor vehicle and enclosing a pressure chamber, a flexible diaphragm comprising one transverse wall of the pressure chamber, a hollow axially extending stem carried centrally by the diaphragm and communicating with the chamber, means defining an axially extending non-rotating passage into which the stem fits, said passage being enlarged toward the outer end to provide a shoulder surrounding the hollow stem, a yieldable packing gasket resting on the shoulder and surrounding the stem, a conical seat member resting on the gasket and surrounding the stem, a cooperating seat member on the stem, a connection from each pressure chamber to its associated tire, pressure indicating means mounted on the vehicle, a connection from each non-rotating passage to the pressure indicating means, a compressor mounted on the vehicle, and means to connect the compressor to the non-rotating passage.

6. In a pneumatic tire pressure indicating device, a rotary hub cap including a pressure chamber, a conduit connecting the pressure chamber to the tire, a flexible diaphragm forming the inner wall for the pressure chamber, a non-rotating part having a passage therein facing the diaphragm, a hollow stem carried by the diaphragm and extending into the passage to connect the pressure chamber to the latter, cooperating seat members on the stem and the non-rotating part, and means to indicate the pressure in the passage.

7. In a vehicle pneumatic tire pressure indicating apparatus, a vehicle wheel with a pneumatic tire mounted thereon, a hub cap for the wheel, means defining a pressure chamber in the hub cap, means connecting the pressure chamber to the tire, a flexible wall for the pressure chamber extending transversely of the hub cap, a hollow axially extending stem carried by the flexible wall, a relatively stationary part associated with the hub cap and having an axially extending passage therein, the hollow stem extending into the passage, cooperating seat members carried by the stem and the stationary member and held in contact by the pressure in the pressure chamber, and pressure indicating apparatus connected to the passage.

8. In a vehicle pneumatic tire pressure indicating apparatus, a vehicle wheel with a pneumatic tire mounted thereon, a hub cap for the wheel, means defining a pressure chamber in the hub cap, means connecting the pressure chamber to the tire, a flexible wall for the pressure extending transversely of the hub cap, a hollow axially extending stem carried by the flexible wall, a relatively stationary part associated with the hub cap and having an axially extending passage therein, the hollow stem extending into the passage, cooperating seat members carried by the stem and the stationary member and held in contact by the pressure in the pressure chamber, packing means in the passage surrounding the hollow stem, a conical seat member in the passage surrounding the hollow stem, a cooperating seat member on the stem, and pressure indicating apparatus connected to the passage.

9. Apparatus for indicating and controlling the pressure in pneumatic tires of motor vehicles, comprising an air compressor, means to operate the air compressor from the vehicle motor, distributing valve means in communication with the compressor, a hub cap on each vehicle wheel including a pressure chamber connected to its associated tire, a diaphragm wall for the pressure chamber extending transversely of the hub cap, a hollow stem carried by the diaphragm and extending axially of the hub cap, a non-rotating part opposite the diaphragm having an axially extending passage therein, the hollow stem extending into the passage and rotating therein, an inverted conical seat member in the passage surrounding the hollow stem, a cooperating seat member on the hollow stem adapted to rotate in fluid tight engagement on the first seat member, and a connection from each of said passages to the distributing valve means.

10. Apparatus for indicating and controlling the pressure in pneumatic tires of motor vehicles comprising a reciprocating air compressor, a piston in the compressor, a reciprocating member driven by the engine of the motor vehicle pressure operated means for connecting the reciprocating member to the piston to operate the latter, a distributing valve seat, a connection from the compressor to the seat, a hub cap on each vehicle wheel including a pressure chamber connected to its associated tire, a diaphragm wall for the pressure chamber extending transversely of the hub cap, a hollow stem carried by the diaphragm and extending axially of the hub cap, a non-rotating part opposite the diaphragm having an axially extending passage therein, the hollow stem extending into the passage and rotating therein, means in the passage to provide a fluid tight sliding fit around the stem, a connection from each of said passages to the distributing valve seat, and a distributing valve member provided with ports adapted to connect said passages selectively through the valve seat to the compressor and to each other to inflate and equalize the pressure in the tires.

11. Apparatus for indicating and controlling the pressure in pneumatic tires of motor vehicles comprising a reciprocating air compressor, a piston in the compressor, a reciprocating member driven by the engine of the motor vehicle, pressure operated means for connecting the reciprocating member to the piston to operate the latter, a distributing valve seat, a connection from the compressor to the seat, a hub cap on each vehicle wheel including a pressure chamber connected to its associated tire, a diaphragm wall for the pressure chamber extending transversely of the hub cap, a hollow stem carried by the diaphragm and extending axially of the hub cap, a non-rotating part opposite the diaphragm having an axially extending passage therein, the hollow stem extending into the passage and rotating therein, means in the passage to provide a fluid tight sliding fit around the stem, a connection from each of said passages to the distributing valve seat, a distributing valve member provided with parts adapted to connect said passages selectively through the valve seat to the compressor and to each other to inflate and equalize the pressure in the tires, and means in said distributing valve member to connect said passages to the pressure operated member to operate the pump.

WALTER H. DAVIS.